United States Patent [19]

Maki et al.

[11] 4,113,839

[45] Sep. 12, 1978

[54] NITROGEN OXIDES REMOVAL METHOD

[75] Inventors: Masao Maki, Nabari; Yasunori Kaneko, Ando; Kunihiro Tsuruda, Yamatokoriyama; Ikuo Kobayashi, Nara, all of Japan

[73] Assignee: Matsushita Electric Industrial Co., Ltd., Osaka, Japan

[21] Appl. No.: 846,495

[22] Filed: Oct. 27, 1977

[30] Foreign Application Priority Data

Oct. 29, 1976 [JP] Japan ................................. 51-130753

[51] Int. Cl.$^2$ ............................................. B01D 53/34
[52] U.S. Cl. .................................... 423/239; 252/446; 252/447
[58] Field of Search ...................... 423/239; 55/68, 74; 252/436, 446, 447

[56] References Cited

U.S. PATENT DOCUMENTS

| Re. 16,896 | 3/1928 | Ray | 252/446 |
|---|---|---|---|
| 1,140,124 | 5/1915 | Dalen | 252/446 |
| 3,498,743 | 3/1970 | Kyllonen | 423/239 |
| 3,864,450 | 2/1975 | Takeyama et al. | 423/239 |

*Primary Examiner*—G. O. Peters
*Attorney, Agent, or Firm*—Wenderoth, Lind & Ponack

[57] ABSTRACT

Nitrogen oxides removal method wherein nitrogen oxides are removed from a gas by bringing the gas into contact with a granulated material containing an alkali and cement material, active carbon and a binder. The active carbon promotes an absorption reaction between the alkali material and nitrogen oxides, the cement material provides a porous but strong structure to the material, and the binder permits longer use of the material in a wide range of conditions.

10 Claims, 9 Drawing Figures

NITROGEN OXIDES REMOVAL METHOD

The present invention relates to a method for removal of nitrogen oxides, $NO_x$, from the atmosphere. More particularly, the invention relates to a removal method employing dry-type equipment having good removal efficiency at low concentrations of $NO_x$ and also permitting maintenance of $NO_x$ removal efficiency over a long period.

Nitrogen oxides, $NO_x$, are known as atmospheric pollutants which, when present in certain concentrations in the atmosphere, are harmful and also contribute to formation of photochemical smog. Concentrations at which $NO_x$ can be harmful, directly or indirectly, are reached regularly in many large towns throughout the world, and there have been accordingly proposed a great many methods and means for suppression of $NO_x$. Nearly all $NO_x$ suppression methods and means proposed hitherto have been aimed at suppression of $NO_x$ at fixed sources of emission of $NO_x$ or in automobile exhaust gas, for example. While considerable progress has been achieved and it may be said that the atmosphere as a whole has been rendered cleaner thanks to the proposed methods and means, high local concentrations are still regularly achieved. There has been little or no progress made towards elimination of such local concentrations of $NO_x$. High local concentrations of $NO_x$ are liable to occur in congested areas of towns, and also concentrations as high as 1 ppm to 5 ppm are frequently reached in indoor locations simply because of the use of open-type burning or heating equipment, for example.

Most known methods of $NO_x$ removal make use of larger fixed equipment, a representative conventional $NO_x$ removal method being the so-called dry method in which selective reduction of constituents of the atmosphere is effected by using ammonia as the reducing agent. This method, however, cannot be applied to removal of $NO_x$ when $NO_x$ concentration level is low.

To effect removal of $NO_x$ at low levels of concentration, it may be considered advantageous to employ adsorption or absorption methods. According to one of the oldest known adsorption methods, use is made of active carbon. The only nitrogen oxide with which active carbon reacts is nitrogen dioxide. While active carbon can remove this form of $NO_x$ to a certain extent, at the same time it has a tendency to reduce nitrogen dioxide to nitrogen monoxide. The capacity of active carbon for removal of nitrogen dioxide increases as vapour pressure (relative humidity) increases, but in dynamic conditions the nitrogen dioxide adsorption capacity per unit mass of active carbon is small, being of the order of 2 to 3mg-$NO_2$/1ml active carbon.

A representative example of the application of absorption techniques for cleaning the atmosphere is the method which makes use of the fact that nitrogen dioxide, $NO_2$ is easily absorbed in an aqueous alkaline solution, and in which absorption of $NO_2$ is effected by a porous carrier, such as Japanese paper or non-woven cloth, which is thoroughly moistened with a mainly alkaline solution, and usually including a moisture-maintaining agent such as glycerin.

This method was developed primarily for the purpose of removal from the atmosphere of other pollutants, mainly $SO_2$, rather than of $NO_2$, and efficiency of $NO_2$ absorption therein is accordingly low. Further, for practical reasons it is difficult for a large amount of the alkali solution to be absorbed by the porous carrier, with the overall result that, as in the method using active carbon, capacity for removal of $NO_2$ is small. Also, since the method is a wet method, the risk of scatter of spray or drops of fluid makes it impossible to increase the air flow rate, or space velocity (SV), above a certain value during application of the method, and the absorbent material must be made extremely bulky if it is required to effect $NO_2$ removal with space velocities of the order of 1,000 to 2,000 ($hr^{-1}$).

At a pollutant emission source, the $NO_x$ consists almost entirely of NO, but this NO is gradually oxidized to $NO_2$ in the atmosphere. According to recent data from pollution monitoring centers, NO and $NO_2$ are generally in an approximately 1/1 ratio. It is presumed that this is because the oxidation rate of NO becomes slower as concentration thereof decreases, and that a balance is reached just in the vicinity of a 1/1 ratio of NO and $NO_2$.

It is an object of the invention to provide a nitrogen oxides removal method which is particularly suited to removal of $NO_2$, even at low levels of concentration of $NO_2$, and which makes use of an absorption reagent which is easy to handle, has good reactivity, and may be used for a longer time than materials such as active carbon.

It is another object of the invention to provide a nitrogen oxides removal method which produces a very efficient removal of $NO_2$ from the atmosphere even when the ratio of NO to $NO_2$ in the atmosphere is in the vicinity of 1/1.

It is a further object of the invention to provide a nitrogen oxides absorption reagent whose hardness is not reduced due to humidity.

In accomplishing these and other objects there is provided, according to the present invention, a nitrogen oxides removal method employing an absorption reagent consisting of alkali, cement, and active carbon powder together with a high molecular binder. These materials are blended and then granulated to form granules of a suitable size.

A better understanding of the present invention may be achieved from the following full description of several embodiments thereof when read with reference to the attached drawings in which.

Figure 1:
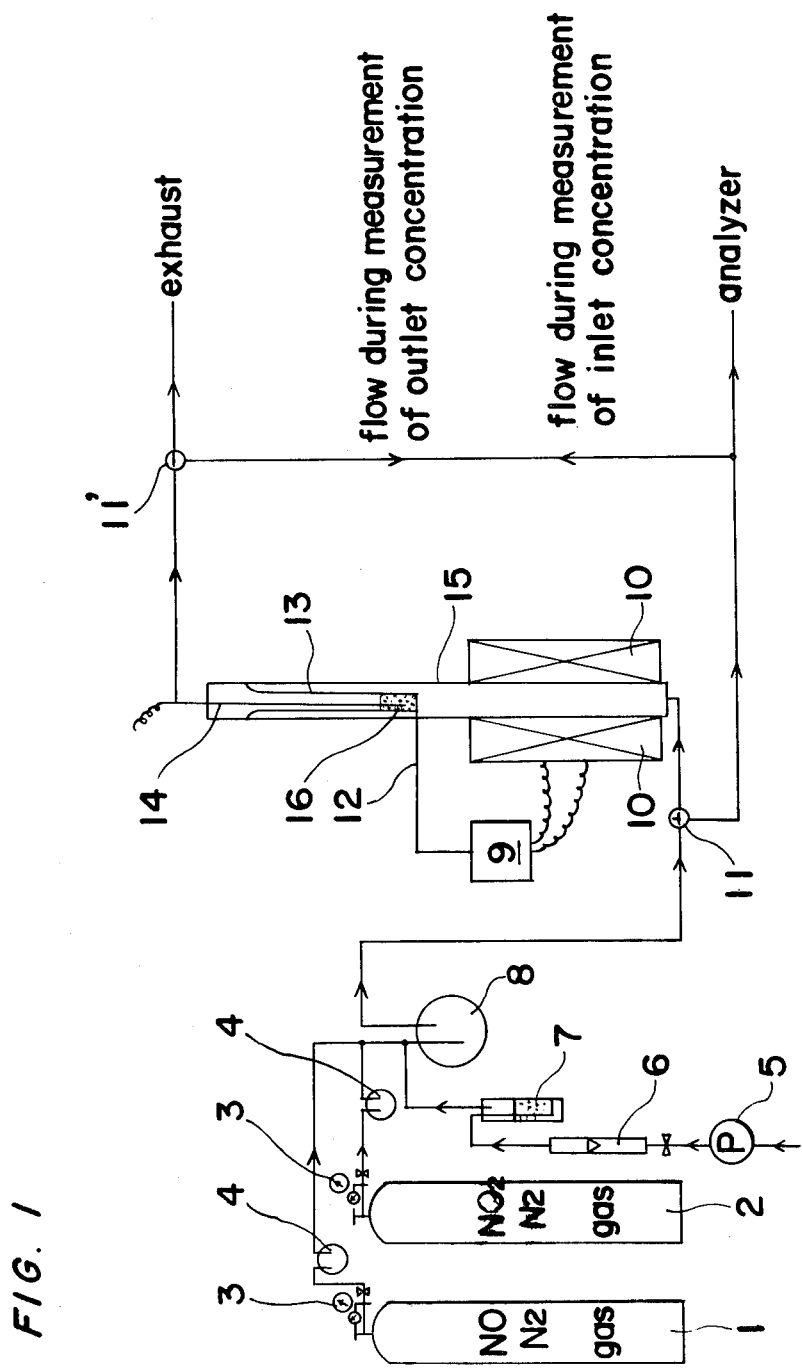
FIG. 1 is a schematic view of test equipment employed in testing the method of the invention.

The reasons for the selection of the composition described below and of the absorption reagent employed in the means of the invention are set forth below. Reactions of aqueous alkaline solutions and $NO_x$ are well-known, reactions when the alkali is potassium carbonate, $K_2CO_3$, for example, being as follows:

(1) Reaction with NO
   No reaction
(2) Reaction with $NO_2$

$$2NO_2 + K_2CO_3 \rightarrow KNO_3 + KNO_2 + CO_2$$

(3) Reaction with $N_2O_3(NO + NO_3)$

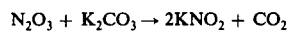
$$N_2O_3 + K_2CO_3 \rightarrow 2KNO_2 + CO_2$$

Similar reactions are known to take place when the alkali is a substance such as NaOH, KOH, $NH_4OH$, $Na_2CO_3$, $NH_4CO_3$, $Ca(OH)_2$, or $Mg(OH)_2$.

The abovenoted reactions are liquid-phase reactions, and when taking place in the presence of water are chemical absorption reactions, mainly depending on an ionic reaction. As noted earlier, when $NO_x$ absorption is effected in a wet process, it is not possible to increase space velocity (SV) more than a certain amount, because of the scatter of drops of fluid. Such process therefore presents problems in terms of practical application. On the other hand, if the removal reagent is in the form of mixed and granulated alkali and cement material, passing $NO_x$ gas in which $NO/NO_2 = 1/1$ through the granulated material results in practically no removal of $NO_x$, as may be seen from Table 1, which shows results achieved with various compositions of $NO_x$ removal reagents. This is probably because the speed at which $NO_x$ is absorbed by the reactive material is slow. The reaction of $NO_x$ with these types of absorptive materials is thought to be extremely complex, but it is supposed that removal of $NO_x$ from air passed through packed layers of granulated absorption material comprises the following stages:

1. A stage of generalized mass transfer related to gas flow and mixing;
2. A stage of laminar mass transfer between the absorptive material and the flowing gas;
3. A stage of diffusion of gas into pores of the porous absorptive material;
4. A stage of reaction taking place at the reactive surface of the porous absorptive material.

Of these stages, for a reaction process which, like that of the invention, is intended to remove $NO_x$ in normal temperature conditions, the reaction of stage 4, unless it is unusually rapid, is the rate determining step. For this reason, in the materials of Table 1, materials consisting only of hardened, formed alkali and cement materials can be regarded as having low $NO_x$ removal efficiency.

In consideration of these facts, the inventors conducted numerous tests in which there was employed, as the $NO_x$ removal reagent, alkali and cement compositions to which were added various types of material which could be expected to increase the reaction speed of the composition, i.e., to act as catalysts. It was found from these tests that addition of active carbon powder gives excellent $NO_x$ removal results.

The inventors prepared mixtures of alkalis and cement materials, in the ratio of 2 to 3 by weight, and tested these mixtures for $NO_x$ removal. The alkalis employed included $K_2CO_3$, $Na_2S_2O_3$, NaOH, $Na_2SO_3$, $CO(NH_2)_2$, $CaHPO_4$, and KOH, and the cement materials included alumina cement, bentonite, and calcined gypsum.

The tests conducted by the inventors consisted of passing through the various materials air containing 100 ppm of gas composed of NO and $NO_2$ in the approximate ratio 1/1, ambient temperature being 30° C., relative humidity 50% and space velocity SV 25,000 ($h^{-1}$), and assessment of the materials being made in terms of average $NO_x$ removal rate during the initial 30 minutes of passage of the gas-containing air. The equipment used in these and other tests described below had the configuration shown in FIG. 1, to which reference is now made.

The equipment shown in FIG. 1 is a known fixed bed-type gas reaction equipment and comprises a first standard gas cylinder 1 holding a supply of $N_2$ gas containing approximately 10,000 ppm of NO, and a second standard gas cylinder holding a supply of $N_2$ gas containing approximately 10,000 ppm of $NO_2$, both cylinders 1 and 2 being manufactured by Seitetsu Kagaku Kogyo Co., Ltd. of Japan. Each cylinder 1 and 2 has associated therewith a pressure regulator 3 which is adjustable to maintain a secondary pressure of the order of 0.2 to 1kg/cm², and a constant delivery gas pump 4 able to effect transfer of small amounts of gas. The pumps 4 employed were micro-tube pumps manufactured by Tokyo Rikagaku Co., Ltd. of Japan, and able to transfer gas at a rate of about 0 to 40 ml/min. The outlets of the cylinders 1 and 2 connect to their respective pumps 4 via lines on which there are provided suitable stop valves. Gas from the cylinders 1 and 2 may be supplied to a mixer 8 which also receives input of air which is supplied by a diaphragm-type air pump 5 and which, before being supplied into the mixer 8, is passed through a float-meter 6, for metering air flow, and a humidifier 7, which contains water through which the air is bubbled, and serves to adjust humidity of the air. The mixer 8 dilutes the gas from the cylinders 1 and 2 with air to obtain a gas containing a set concentration of $NO_x$ gas, and supplies the diluted $NO_x$ gas to a three-way cock 11. Depending on the position of the three-way cock 11, the gas may be supplied only to the inlet of a reactor 15 and/or to an analyzer, not shown, for checking composition of the gas used in the test and to means for determining $NO_x$ concentration of gas entering the reactor 15. The reactor 15 is made mainly of pyrex glass and comprises a cylindrical reactor tube 13 having an inner diameter of 18 mm and containing a set amount of absorptive material 16, through which the gas is passed, and has associated therewith heaters 10, which serve to maintain a constant temperature at the inlet of the reactor tube 13, and are controlled by temperature controller 9 in response to movement of a thermocouple 12 provided at the inlet of the reactor tube 13, the heaters 10 also serving to maintain temperature of the absorptive material 16. Temperature of the absorptive material 16 is measured by a separate thermocouple 14. Gas leaving the reactor 15 is suppliable via a three-way cock 11' to means for determining $NO_x$ concentration of the outlet gas and/or to an exhaust system.

Sample mixtures for employment as the absorptive material 16 in the test received 20 to 30 wt% addition of water, were then blended, then dried and hardened at 100° C. for 1 hour, and then ground and classified to provide grains of 4 to 8 mesh, a Tyler sieve being employed for classification. The tests showed that even the most absorptive of the materials consisting only of alkali and cement material removed no more than about 5% $NO_x$ from gas supplied through the reactor.

In contrast to this, efficient $NO_x$ removal rates are achieved if addition of active carbon is made, use of $Ca(OH)_2$ and $K_2CO_3$ alkali material being particularly advantageous, as illustrated by the tests results shown in Table 1, in which all proportions noted are proportions by weight, and 'AC powder' indicates active carbon powder. In all cases the active carbon powder had a grain size such that it passed through a 300 mesh Tyler sieve, and for all the tests whose results are noted the test gas contained approximately 50 ppm of NO and 50 ppm of $NO_2$.

Table 1

| Composition | pro-portion | $NO_x$ removal (%) | | |
|---|---|---|---|---|
| | | NO | $NO_2$ | $NO_x$ |
| NaOH, $Na_2S_2O_3$, $Ca(OH)_2$ | 1:4:10 | 26 | 44 | 35 |
| $K_2CO_3$, $Ca(OH)_2$, $CaSO_4 \cdot \frac{1}{2}H_2O$ | 4:3:3 | 32 | 49 | 40 |
| $Na_2SO_3$, $Ca(OH)_2$, $CaSO_4 \cdot \frac{1}{2}H_2O$ | 4:3:3 | 34 | 51 | 42 |
| $Na_2S_2O_3$, $Na_2CO_3$, $CaSO_4 \cdot \frac{1}{2}H_2O$ | 4:3:3 | 32 | 49 | 40 |
| $Na_2S_2O_3$, $Na_2SO_3$, $Ca(OH)_2$ | 2:2:6 | 62 | 51 | 56 |
| $K_2CO_3$, $Ca(OH)_2$, $CaSO_4 \cdot \frac{1}{2}H_2O$ | 6:2:2 | 52 | 8 | 29 |
| " | 5:2:3 | 50 | 6 | 27 |
| " | 4:2:4 | 54 | 6 | 29 |
| " | 3:4:3 | 48 | 4 | 25 |
| $K_2CO_3$, $Ca(OH)_2$, $CaSO_4 \cdot \frac{1}{2}H_2O$, AC powder | 3.5:3:3:0.5 | 60 | 62 | 61 |
| " | 4:3:2:1 | 64 | 83 | 74 |
| " | 4:2:3:1 | 51 | 77 | 65 |
| " | 4:1:4:1 | 33 | 85 | 54 |
| " | 3:3:2:2 | 51 | 85 | 69 |
| " | 3:2:3:2 | 40 | 74 | 58 |
| " | 3:1:4:2 | 62 | 75 | 69 |
| " | 3.5:3:2:1.5 | 42 | 72 | 58 |
| $K_2CO_3$, $Ca(OH)_2$, $CaSO_4 \cdot \frac{1}{2}H_2O$, Active alumina | 3:3:2:2 | 77 | 23 | 48 |
| $K_2CO_3$, $Ca(OH)_2$, $CaSO_4 \cdot \frac{1}{2}H_2O$, Zeolite(3A) | 3:3:2:2 | 83 | 36 | 58 |
| $K_2CO_3$, $Ca(OH)_2$, Bentonite, AC powder | 3:3:2:2 | 69 | 71 | 63 |
| $K_2CO_3$, $Ca(OH)_2$, Alumina cement, AC powder | 3:3:2:2 | 66 | 80 | 70 |
| $K_2CO_3$, $Ca(OH)_2$, Portland cement, AC powder | 3:3:2:2 | 60 | 80 | 67 |
| $K_2CO_3$, $Ca(OH)_2$, Diatomaceous earth, AC powder | 3:3:2:2 | 56 | 69 | 61 |

As seen from Table 1, a necessary condition for high rates of removal of $NO_x$, particularly of $NO_2$, is the simultaneous presence of active carbon powder and $K_2CO_3$, $Ca(OH)_2$ and other alkalis. The presence of cement material does not have a direct connection chemically with the reaction, but use of cement material over a comparatively wide range is permissible, since it contributes to the production of grains having good porosity and structural stability. From the point of view of forming materials to required shapes and dimensions, it was found advantageous to add materials such as bentonite, alumina cement, alumina sol, silica sol, diatomaceous earth, clay, calcined gypsum, aluminium phosphate, kaolin, or water glass. In particular, optimum $NO_x$ removal capacity was achieved when use was made of calcined gypsum (calcium sulfate).

Best results were achieved with a composition containing $K_2CO_3$/$Ca(OH)_2$/$CaSO_4 \cdot \frac{1}{2}H_2O$/active carbon powder in the proportions 3/3/2/2. In one test in which the absorptive material had this composition, and was prepared by being extruded to a diameter of 3 mm and then granulated, and in which a test gas having a composition in which $NO_2$ = 1.4 ppm and NO = 0.2 ppm was passed through the absorptive material in conditions of 30° C. and relative humidity of 60%, it was found that 95% removal of $NO_2$ and 10% removal of NO was achieved up to a space velocity SV of 25,000 ($h^{-1}$), 95% removal of $NO_2$ and 5% removal of NO was achieved when SV was 50,000 ($h^{-1}$), and 90% removal of $NO_2$ was achieved and removal of NO was approximately 0 when SV was 100,000 ($h^{-1}$). From this, it is seen that the invention offers particular advantages with respect to removal of $NO_2$ from the atmosphere when the concentration level of $NO_2$ is low.

It is thought that the good results achieved are due to the fact that $NO_x$ is adsorbed by the active carbon, then refused into the interior of the absorptive material and reacts with $K_2CO_3$, $Ca(OH)_2$, etc., in a process in which the active carbon acts as a kind of catalyst. It is supposed that the active carbon serves as a catalyst rather than contributing directly to removal of $NO_x$, since when active carbon is used alone, in dynamic conditions its adsorption capacity, i.e., its saturation adsorption capacity is at most 2 mg-$NO_2$/1 ml of active carbon, whereas $NO_x$ removal capacity of the material employed according to the invention is as high as approximately 50 mg-$NO_2$/1 ml of removal reagent. This efficiency of $NO_x$ removal can only be thought to be achieved as a result of reaction with $K_2CO_3$, $Ca(OH)_2$, or another alkali material. On the other hand, although an alkali material can react both with $NO_2$ and with $N_2O_3$, as indicated by the abovenoted reaction formulae, it is known that the reaction with $NO_2$ proceeds slowly and that reaction speed in the reaction with $N_2O_3$ is fast. $N_2O_3$ is an intermediate form of nitrogen oxide and does not exist as a stable compound in the atmosphere. However, it is possible that nitrogen oxide is adsorbed by active carbon in the form of $N_2O_3$. Further, active carbon itself acts to reduce atmospheric $NO_2$ that is passed through it to NO, but once the amount of adsorbed $N_2O_3$ is such that the amount of $NO_2$ is of the order of 2 mg-$NO_2$/1 ml active carbon, it is no longer effective in removal of $NO_x$. In the material employed according to the invention, however, there is a cycle in which $N_2O_3$ adsorbed by the active carbon is absorbed by and reacts with the alkali material. In other words, the active carbon assists and increases speed of reaction of $NO_x$ with the alkali material and is also enabled to absorb further $N_2O_3$ without becoming saturated.

It may be presumed that reaction in which $NO_x$ is absorbed by alkali takes place and that this reaction proceeds at a level which is close to that of the $NO_x$ alkali equivalent absorption reaction. However, this level is close to the amount of absorption achieved by the material as a whole, i.e., 50 mg-$NO_2$/1 ml sample material. This again makes it possible to assume that the active carbon acts as a catalyst, rather than contributing to absorption.

Figure 2:
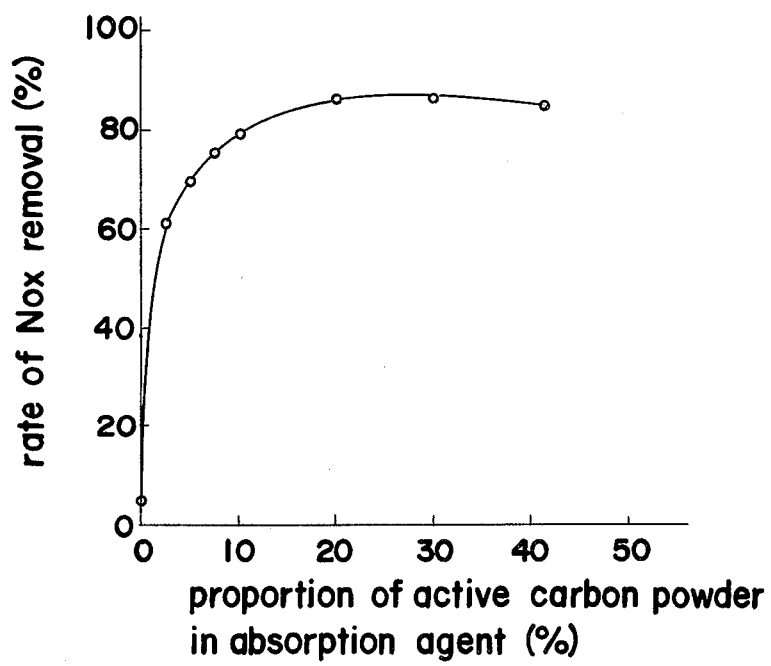
FIG. 2 is a graph showing the relation between rate of $NO_x$ removal and the proportion of active carbon powder in the absorption reagent employed in the method of the invention.

FIG. 2 shows the effect on $NO_2$ removal rate by addition of varying amounts of active carbon powder to a material in which the constituents $K_2CO_3$/$Ca(OH)_2$/$CaSO_4 \cdot \frac{1}{2}H_2O$ were maintained constant, the mixtures being subsequently granulated and tested by the equipment of FIG. 1. It is seen that addition of active carbon powder has effect for amounts greater than 2.5 wt%, but for additions more than 30 wt% no improvement in characteristics is achieved. On the other hand, large additions of active carbon powder adversely affect formability, and the range of active carbon powder addition is therefore preferably 2.5 to 30 wt%.

Silica gel, alumina, and molecular sieves, as well as active carbon as adsorption means are used in conventional processes for cleaning air in which there is low $NO_x$ concentration, but of these conventionally known means, active carbon may be said to have the best characteristics.

For removal of NO in low concentrations, a known effective method is to provide as an adsorption means a carrier such as active alumina gel, active bauxite, or active silica alumina gel, on which has been adsorbed and dried one or more of the substances including $FeSO_4$, $PbSO_4$, $KMnO_4$, $KClO_3$, $NaClO$, $NaClO_2$, $NaMoO_4$, $K_2S_2O_3$, $Na_2S_2O_3$, $Na_2HPO_4$, $Na_2O_2$, and similar substances, alone or together with an acid or alkali. Of these substances, $NaClO_2$ is known to be particularly effective, and it is reported that service life thereof as a removal reagent is increased 3 to 5 times if it is adsorbed together with a strong alkali on a carrier.

An effective known method for removal of low concentration $NO_x$ in general is to provide a cleaning reagent constituted by active carbon impregnated with an alkali material, sodium thiosulfate, or a wetting reagent.

For the purpose of comparison of the effectiveness of the method of the invention with that of the abovenoted conventional methods, the following tests were conducted. Tests There were prepared four types of $NO_x$ removal agents, referred to below as Test Materials 1~4. Test materiMaterial 1 is the material, according to the invention, which is constituted by $K_2CO_3$/$Ca(OH)_2$/$CaSO_4$.$\frac{1}{2}H_2O$/active carbon powder in the porportions 3/3/2/2, Test Material 2 is active carbon, Test Material 3 is constituted by $NaClO_2$ and $NaOH$ absorbed on a carrier constituted by active alumina, and Test Material 4 is constituted by active carbon impregnated with $NaOH$, $Na_2S_2O_3$, and glycerin.

The active carbon used for Test Material 2 was crushed coconut shell carbon manufactured by Takeda Chemical Industries, Ltd. of Japan, and the active alumina for Test Sample 3 was a product of Sumitomo Chemical Co., Ltd. of Japan. These materials were initially prepared by being dried at 90° C. in reduced pressure conditions for 2 hours, after which, for each material, 5g of $NaClO_2$ and 7g of $NaOH$ dissolved in 50 ml of water were caused to be adsorbed by each 100 g of material. The active carbon employed for Sample Material 4 was the same as that employed for Sample Material 2, and after being dried at 90° C. in reduced pressure conditions for 2 hours, was immersed in an aqueous solution containing 20g of $NaOH$, 20g of $Na_2S_2O_3$, 20g of glycerin and 40g of water for each 20g of active carbon, and was subsequently dried at a temperature of approximately 100° C. and in reduced pressure conditions for 6 hours.

The carrier used for Test Material 1, i.e., the material according to the invention, was consituted by $K_2CO_3$/$Ca(OH)_2$/$CaSO_4$.$\frac{1}{2}H_2O$/active carbon powder in the proportions 3/3/2/2, this material being extruded to a diameter of 3 mm and then granulated. The other test materials also were granulated, particle size in all cases being 6 to 8 mesh.

For the tests the test apparatus of FIG. 1 was employed, and in each test the reactor tube contained 5 ml of test material and gas containing 12 ppm of NO and 18 ppm of $NO_2$ was supplied therethrough at a rate of 4 l/min, operating space velocity thus being 48,000 ($h^{-1}$). Temperature of the test material in the reactor tube was 25° C., and relative humidity was maintained at 60%.

Figure 3:
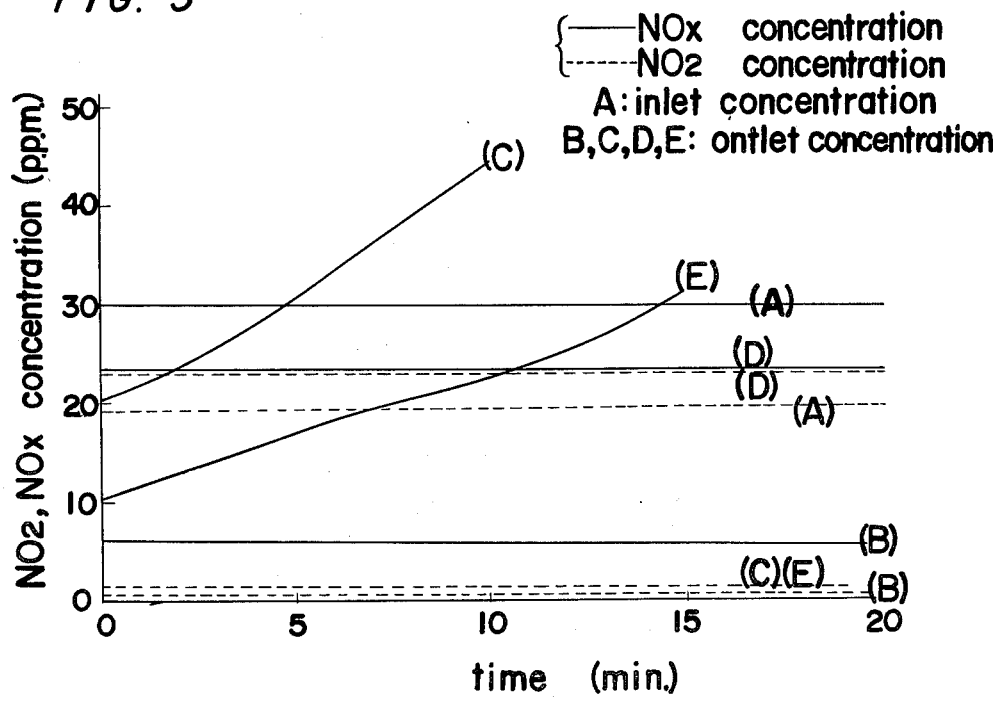
FIG. 3 is a graph comparing $NO_x$ removal capacity in conventional methods and the method of the invention.

Test results are shown in FIG. 3, in which solid lines indicate $NO_x$ concentration and dashed lines $NO_2$ concentration. The difference between the indicated values of concentration is effectively equal to NO concentration. In the graph, curves A plot variation of inlet concentration i.e., concentration of $NO_x$ at the inlet of the reactor, and curves B, C, D and E plot values of outlet concentration when Sample Materials 1, 2, 3 and 4, respectively, are employed as the $NO_x$ removal reagent. From FIG. 3, it is seen that when Test Materials 2 and 4 are employed there is a tendency for $NO_2$ to be reduced to NO, but after a short time adsorbed gas is released, with the result that outlet concentration of $NO_x$ becomes higher than inlet concentration. In contrast to this, with material such as employed in the method of the invention, stable capacity for removal of $NO_2$ is achieved without there being any accompanying release of NO.

Test Material 3 effects almost complete removal of NO, but this seems to be achieved only by conversion of NO to $NO_2$, since outlet $NO_2$ concentration is higher than inlet concentration.

Thus, it is seen from FIG. 3 that with respect to removal of $NO_2$ at normal temperature, the invention offers marked advantages over conventional processes.

Although the invention was shown to have these qualities, it is known that hardness of $NO_x$ material is liable to be reduced due to adsorption of moisture, particularly in conditions of high humidity, and that use of granulated material in locations which are subject to vibrations may result in collapse of the granules of the material. These defects often result in uneven distribution of removal reagent provided in an $NO_x$ removal means, and clogging or pressure loss during passage therethrough of a gas to be cleaned. Although such drawbacks are not basic problems, from the point of view of practical application it is preferable that the $NO_x$ removal reagent further include a binder, suitably, a high molecular binder.

Selection of a suitable high molecular binder presents problems, since, depending on the type of binder added, hardness may be increased but ability to remove $NO_x$ simultaneously decreased, or hardness may be increased initially but in humid conditions decrease to less than that of absorption material which does not include addition of a binder. Decrease of hardness due to humidity may be avoided if the selected binder is hydrophobic, but if the binder is too hydrophobic there tends to be segregation of the binder when water is added to the absorption material in the blending stage preceding granulation.

Figure 4:
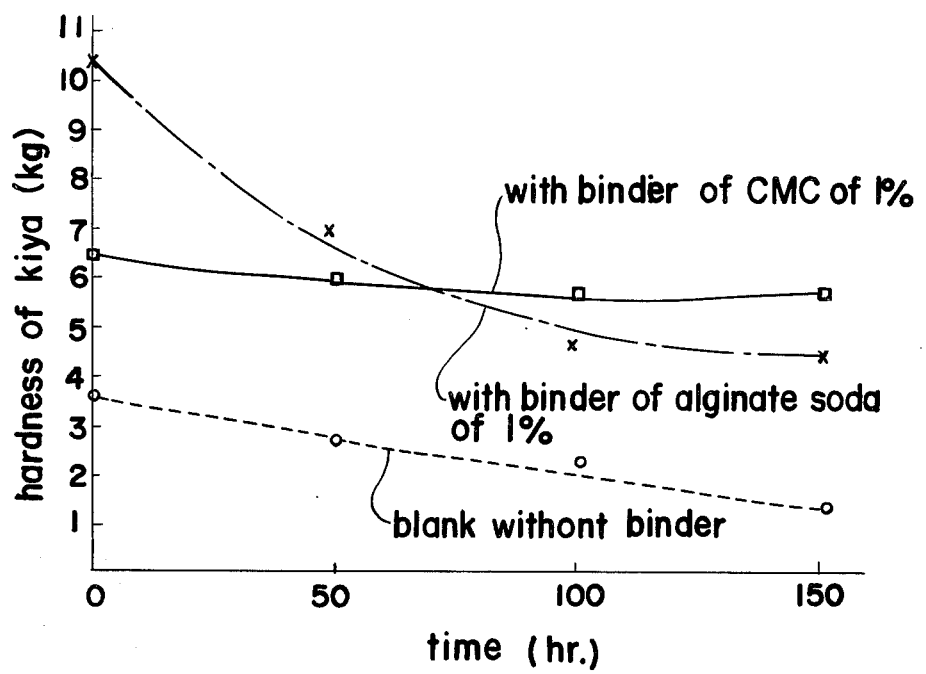
FIG. 4 is a graph showing the effect of binder on change of hardness of absorption reagents caused by absorption of humidity.

The changes of hardness of granulated material with time when the material is left in conditions in which ambient temperature is 30° C. and relative humidity 80%. In the graph of FIG. 4 the dashed line curve indicates values for test material constituted by $K_2CO_3$/$Ca(OH)_2$/$CaSO_4$.$\frac{1}{2}H_2O$/active carbon in the proportions 3/3/2/2 without addition of binder, the chain-dot line values for the same material containing a 1% addition of sodium alginate, and the solid-line curve values for the same material containing a 1% addition of CMC (carboxy methyl cellulose). The absorption material was granulated in the same manner as described for the preceding tests, and additions of binder were made at the blending stage prior to granulation. Values of hardness are expressed in terms of crushing strength, and were measurement by means of a Kiya hardness meter of Japan.

There is seen to be a clear difference in change of hardness depending on whether or not high molecular binder is added. The improved results obtained when binder is added are presumed to result from bridging or filling of inter-particle gaps in the $NO_x$ removal material combined with resistance of the binder to water, so providing improved resistance of the material as a whole to dissolution by water or air pressure. The difference in improvements in hardness achieved by the 5 different types of binder is presumed to result from the difference in resistance to water of the binders, and also to the difference of structure by which the different binders are able to effect bonding, it being known that some binders for example, effect bonding and improve strength almost entirely by bridging of inter-particle gaps, whereas other types of binder form films covering particles and due to their viscosity provide increased strength of bond at points of contact of particles so improving cohesivity of granulated material.

The tests showed that additions of binder in the range of 0.5 to 2% are advantageous. Greater additions are undesirable, since although they can give improved strength, at the same time blockage of pores of the material occurs, so resulting in reduced $NO_x$ removal efficiency. It is seen from FIG. 4 that when sodium alginate is added value of hardness is initially high, but then falls, whereas addition of CMC gives a suitably high initial value of hardness and also maintains hardness at a generally constant level over a prolonged period.

Figure 5:
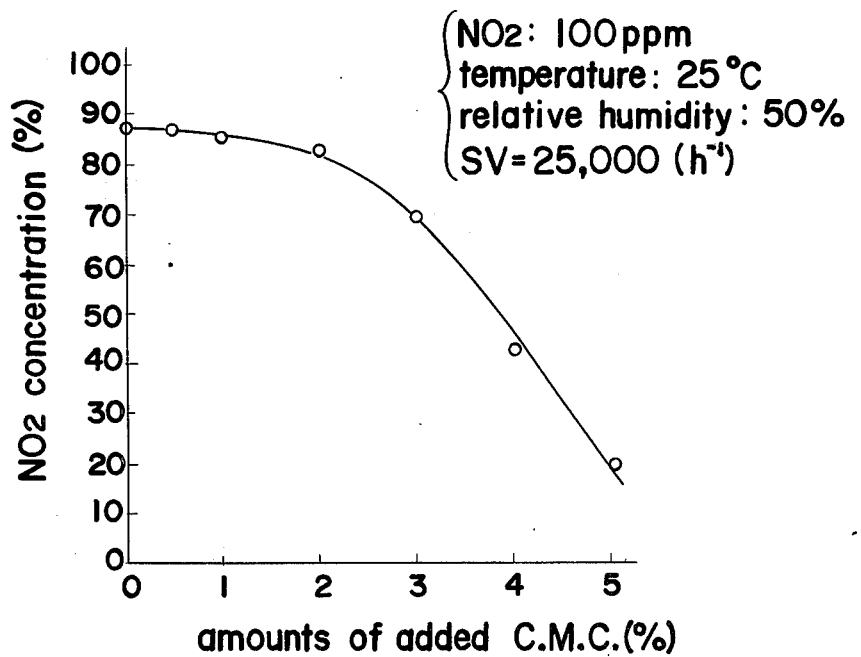
FIG. 5 is a graph showing the effect of $NO_x$ removal rates by additions of varying amounts of carboxy methyl cellulose to the $NO_x$ removal reagent.

In view of this, further tests were conducted, using the same $NO_x$ removal reagent, to determine the effect had on $NO_x$ removal rates by addition of different amounts of CMC as binder. The results of these tests, which were conducted using gas in which $NO_2$ concentration was 100 ppm, are shown in FIG. 5. Other conditions of the tests were temperature = 25° C., relative humidity = 50%, and SV = 25,000 $(h^{-1})$. It is seen from FIG. 5, that up to 2% addition of CMC may be made without causing undue lowering of $NO_x$ removal rate.

Figure 6:
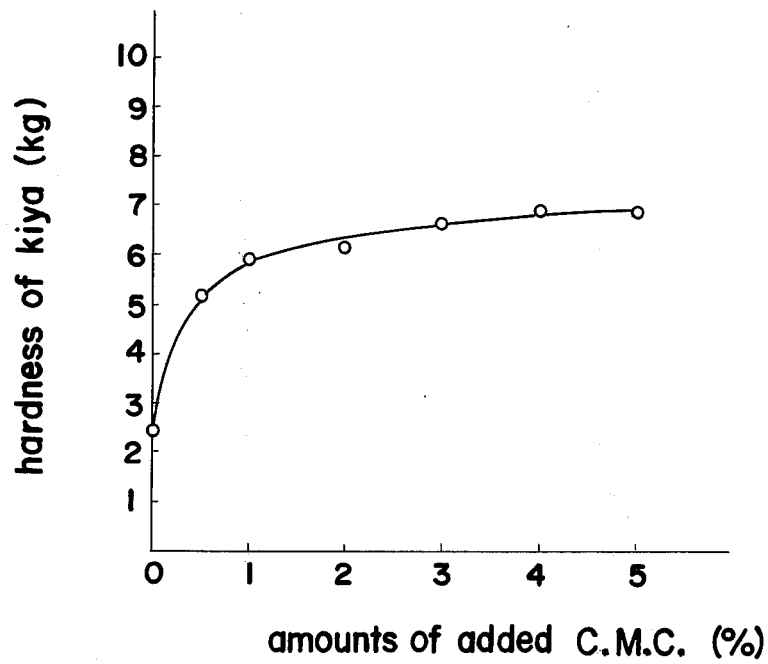
FIG. 6 is a graph showing the relation between addition of carboxy methyl cellulose and change of hardness of the $NO_x$ removal reagent due to use thereof in conditions in which humidity may be absorbed.

FIG. 6 shows the effect of varying amounts of added CMC on hardness of the absorption material used for the tests whose results are shown in FIG. 4. The values plotted in FIG. 6 were determined by means of the Kiya hardness meter after the material had received absorption treatment consisting of 100 hours exposure of the material to 30° C., with relative humidity at 80%. It is seen that from the point of view of hardness advantageous results are achieved by addition of amounts of CMC greater than 0.5%.

Other binders which may be used, apart from CMC, include synthetic resin emulsions, a dispersion of fine grains of polyester acrylate in water being an effective binder for example. It is also possible to employ, for example, methyl cellulose, sodium alginate, starch, molasses, polyvinyl alcohol, or gelatine. Use of these various types of binder was examined and within the scope of the research conducted by the inventors it was found that these binders caused certain problems with respect to formability and resistance to moisture, but results achieved were better than results achieved by $NO_x$ absorption material containing no addition of binder and that from consideration of overall qualities of absorption material, best results are achieved by use of CMC as binder.

Further, tests, whose results are given in Table 2, showed that different results are achieved by using CMC of different molecular weights. From Table 2, it is seen that best results are achieved when the CMC employed has an average molecular weight in the range 100,000 to 150,000.

Table 2

| Average molecular weight | $NO_2$ removal (%) | Initial hardness | Hardness after 100 hrs at 30° C × 80% RH |
|---|---|---|---|
| 50,000 | 86 | 6.5 | 3.4 |
| 100,000 | 89 | 7.3 | 4.0 |
| 150,000 | 88 | 8.9 | 5.2 |
| 200,000 | 79 | 9.7 | 5.4 |
| 250,000 | 72 | 10.9 | 5.7 |

It is thought that the abovenoted range of average molecular weight is optimum since viscosity of CMC to which water is added is proportional to the average molecular weight of the CMC, and whereas a certain amount of viscosity is desirable for achieving improved hardness by infiltration and bridging of inter-particle gaps of $NO_x$ absorption material by the CMC binder, excessive viscosity of the CMC binder results in lowering of porosity and $NO_x$ removal efficiency of the absorption material.

The superiority of CMC, compared with other binder materials, in material composed of $K_2CO_3$, $Ca(OH)_2$, $CaSO_4.\frac{1}{2}H_2O$, and active carbon may be thought to be due to the superior adhesivity of CMC and ability thereof to bridge inter-particle gaps, and also to the greater affinity thereof to alkalis and gypsum ($CaSO_4.\frac{1}{2}H_2O$). A further advantage of CMC is that it is non-toxic, and is widely used in medical products and food products, and so presents no problems in manufacturing or handling processes.

In summary, the effects of the various components of the material employed according to the invention, $K_2CO_3$, $Ca(OH)_2$ or other alkalis take part in an equivalent absorption reaction with $NO_2$, and cement material, such as $CaSO_4.\frac{1}{2}H_2O$, etc., contributes to hardness and porosity of $NO_x$ absorption material after mixing and drying thereof, and so ensures that the absorption material has a structure which is strong and also permits good contact with gas. Addition of active carbon helps to speed up absorption of $NO_2$ by the alkali material, while addition of a high molecular binder improves strength, and in particular prevents strength of the absorption material being lowered due to absorption of moisture.

Figure 7:
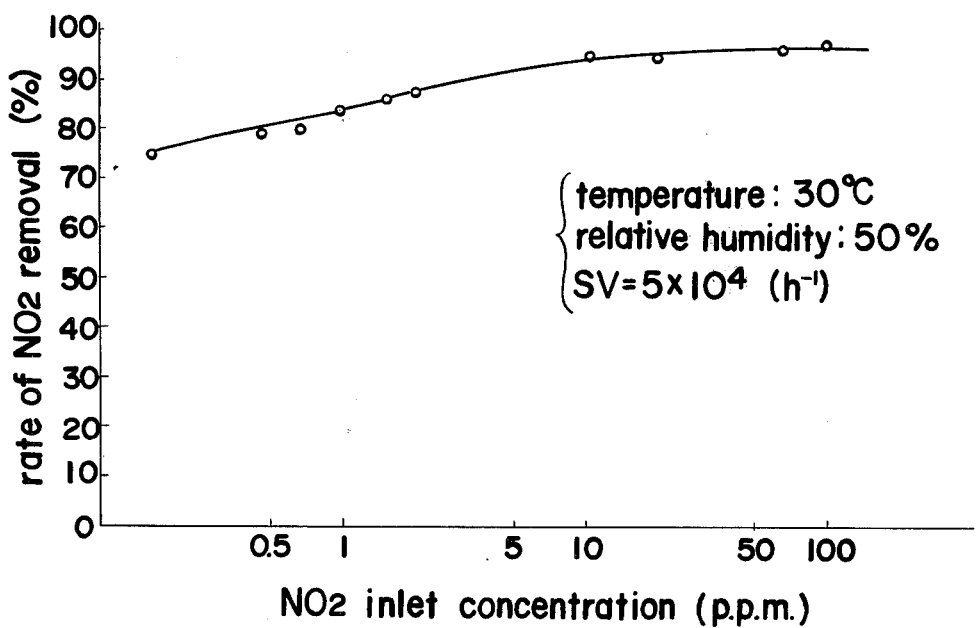
FIG. 7 is a graph showing relation between $NO_x$ concentration and $NO_x$ removal rates.
Figure 8:
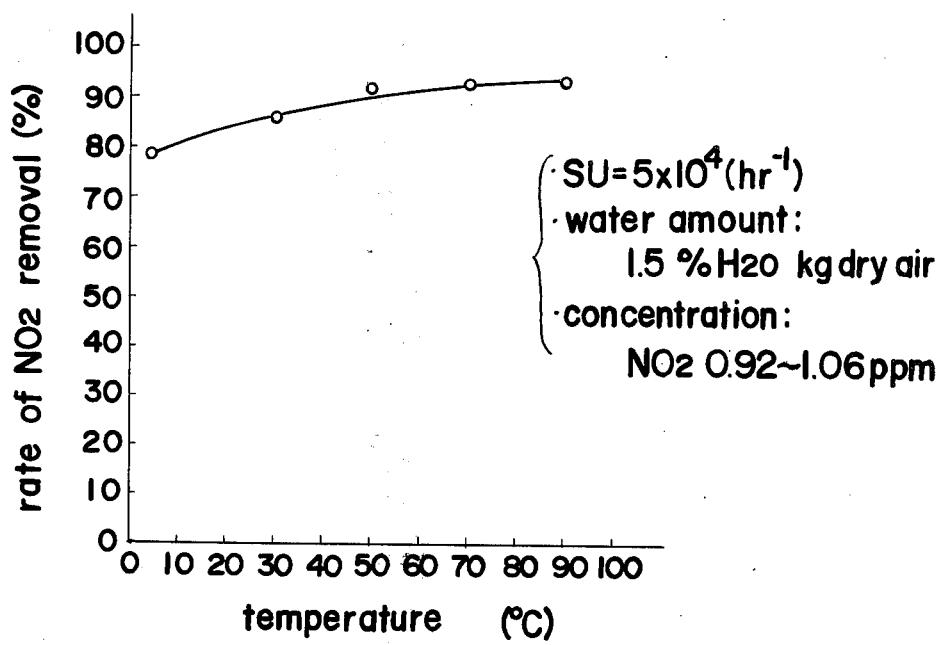
FIG. 8 is a graph showing relation between temperature and $NO_x$ removal rates.
Figure 9:
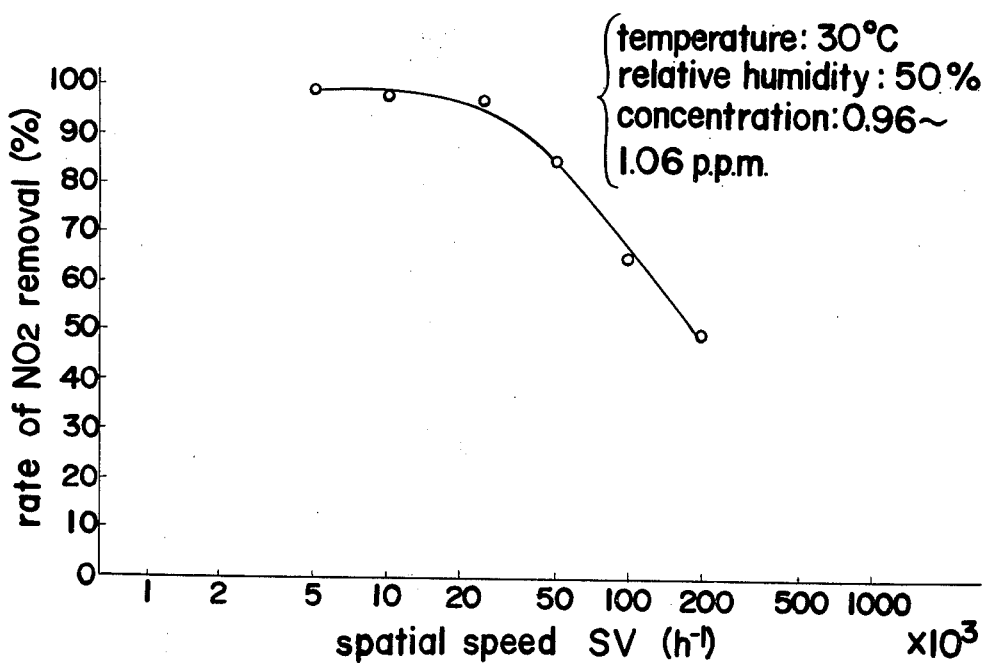
FIG. 9 is a graph showing relation between space velocity and $NO_x$ removal rates.

The efficiency of $NO_x$ removal achieved by the invention may be further appreciated from FIGS. 7, 8 and 9, which are graphs plotting $NO_x$ removal rates of material constituted by $K_2CO_3/Ca(OH)_2/CaSO_4.\frac{1}{2}H_2O$/active carbon in the proportions 3/3/2/2 and containing a 1% addition of CMC in various conditions. The material employed was extruded to a diameter of 3 mm, and then granulated, to obtain products 5 to 15 mm in length.

FIG. 7 plots $NO_2$ removal rates in test conditions in which temperature = 30° C., relative humidity = 50%, SV = 5 × $10^4 (h^{-1})$, and inlet concentration of $NO_2$ is varied. It is seen that good results are achieved, even for low levels of inlet concentration of $NO_2$.

FIG. 8 plots $NO_2$ removal rates when inlet concentration of $NO_2$ is 1 ppm, absolute humidity is 1.5 kg% $H_2O$/kg dry air, SV is 5 × $10^4 (h^{-1})$, and temperature is varied. Efficient $NO_2$ removal is seen to be achieved over a range of temperatures from 10° C. to 100° C. In the abovenoted test conditions, inlet gas is saturated at temperatures below 20° C.

FIG. 9 shows the effect of SV on $NO_2$ removal when inlet concentration of $NO_2$ is 1 ppm, temperature is 30° C., and relative humidity is 50%. It is seen that excellent removal rates are achieved for SV of up to $5 \times 10^4$ ($h^{-1}$).

Although the present invention has been fully described by way of example with reference to the attached drawings, it is to be noted that various changes and modifications are apparent to those skilled in the art. Therefore, unless otherwise such changes and modifications depart from the scope of the present invention, they should be construed as included therein.

What is claimed is:

1. A method of removing nitrogen oxides from a gas which comprises contacting a gas containing nitrogen oxides therein with a formed substance at temperatures between 10° C. and 100° C., said formed substance comprising an alkali material in an amount sufficient to react with and remove the nitrogen oxides from the gas, an active carbon in the range of 2.5 to 30% by weight, a cement material in amounts sufficient to cement the various components together and a binding amount of a high molecular weight binder material selected from the group consisting of carboxymethyl cellulose, methyl cellulose, sodium alignate, starch, polyvinyl alcohol, polyester acrylate, molasses, and gelatin.

2. A method according to claim 1, wherein the alkali material is composed of $K_2CO_3$ and $Ca(OH)_2$, said cement material is composed of $CaSO_4 \cdot \frac{1}{2}H_2O$ and the proportions of $K_2CO_3/Ca(OH)_2/CaSO_4 \cdot \frac{1}{2}H_2O$/active carbon in said formed substance are 3/3/2/2.

3. A method according to claim 1, wherein the alkali material is selected from one or more members selected from the group consisting of hydroxides and carbonates of alkali metals or alkaline earth metals.

4. A method according to claim 1, wherein the cement material is at least one member selected from the group consisting of bentonite, alumina cement, alumina sol, silica sol, diatomaceous earth, clay, calcined gypsum, portland cement, aluminum phosphate, kaolin and water glass.

5. A method according to claim 4, wherein the cement material is calcined gypsum.

6. A method according to claim 1, wherein the alkali material is at least one member selected from potassium carbonate, and calcium hydroxide.

7. A method according to claim 1, wherein the high molecular weight binder material is carboxymethyl cellulose.

8. A method according to claim 1, wherein the binder is present in the range of 0.2 to 2 parts by weight per 100 parts by weight of the combined alkali material, active carbon and cement material.

9. A method according to claim 8, wherein the binder is carboxymethyl cellulose having an average molecular weight in the range of 100,000 to 150,000.

10. A method of removing nitrogen oxides from a gas, which comprises contacting a gas containing nitrogen oxides therein with a formed substance at a temperature of between 10° C. and 100° C., said formed substance comprising an alkali material which is at least one member of the group consisting of hydroxides and carbonates of alkali metals or alkaline earth metals in an amount sufficient to react with and remove the nitrogen oxides from the gas, active carbon in the range of 2.5 to 30% by weight, a cement material in an amount sufficient to cement the various components together selected from at least one member of the group consisting of bentonite, alumina cement, alumina sol, silica sol, diatomaceous earth, clay, calcined gypsum, portland cement, aluminum phosphate, kaolin and water glass and a high molecular weight binding material which is at least one member selected from the group consisting of carboxymethyl cellulose, methyl cellulose, sodium alginate, starch, polyvinyl alcohol, polyester acrylate, molasses and gelatin in an amount of 0.5 to 2 parts by weight per 100 parts by weight of the combined alkali material, active carbon and cement material.

* * * * *